Patented Feb. 26, 1935

1,992,804

UNITED STATES PATENT OFFICE 1,992,804

PROCESS OF PRODUCING GLUTAMIC ACID COMPOUNDS

Edward Bartow and Raymond L. Albrook, Iowa City, Iowa, assignors to A. E. Staley Manufacturing Company, Decatur, Ill., a corporation of Delaware No Drawing. Application July 9, 1932,
Serial No. 621,750

4 Claims. (Cl. 260—119)

This invention relates to the production of glutamic acid compounds and has for its principal object the provision of an economical and practical process for producing glutamic acid compounds from corn gluten as ordinarily derived in the manufacture of starch from Indian corn.

Glutamic acid may be extracted from corn gluten by digesting the gluten with hydrochloric acid. Such reaction, however, produces a considerable amount of char and decomposed organic matter which is difficult to remove from the produced glutamic acid, after digestion is completed.

This invention contemplates the separation of the prolamin or zein from the gluten and digestion of the zein or prolamin to provide the glutamic acid and/or glutamic acid compounds. Experiment has demonstrated that where the prolamin or zein (as contradistinguished from raw corn gluten) is digested char and decomposed solid matter need not be produced and a resultant mother liquid is obtainable from which the glutamic acid hydrochloride crystallizes easily and completely.

The zein or prolamin may be extracted from the gluten in accordance with the process described in the pending application for United States Letters Patent Serial No. 558,840 filed August 22, 1931 by Donald William Hansen, which consists generally of extraction of the prolamin or zein from gluten press cake by the use of a solvent consisting of a mixture of an alcohol and water. The alcohol conveniently may be either ethyl, methyl or propyl alcohol, or a mixture of these alcohols. Ordinarily, the ratios by volume of alcohol and water will be in the general neighborhood of 70% or 80% alcohol and 30% or 20% water. In production, a bulking material, such as corn hulls, is mixed with the alcoholic solution and heated in a suitable extractor to about 140° F. The gluten press cake, containing about 50% water, is slowly added while the mass is constantly stirred. When sufficient gluten has been added to bring the zein concentration up to approximately 6%, the stirring is stopped and after a short period of rest the solvent is drained away. The zein solution is filtered and evaporated to a thin syrupy consistency. A 70% alcohol solvent is used and the remaining solvent will contain about 50% water. On cooling the zein precipitates as a viscous liquid containing about 50% solids, 25% alcohol and 25% water. The supernatant liquid is removed and an equal weight of substantially 95% alcohol is added and thoroughly mixed with the zein. This mixture provides a paste of approximately 25% solids in an 83% alcohol solvent.

The zein is or may be precipitated from the first alcohol solution into a relatively large body of water and passing the residual gummy mass through rollers and drying at a low temperature, preferably under a vacuum.

The glutamic acid hydrochloride may be prepared in accordance with the present invention by treating this zein with hydrochloric acid. A typical example of such treatment consists of treating 150 grams of prolamin paste with 250 cc. of hydrochloric acid in a 1 liter flask. The flask is preferably connected with a reflux condenser and heated to boiling from 8–12 hours. The resultant mass while still warm is preferably decolorized by 25 grams of vegetable charcoal and filtered. The resulting filtrate is concentrated under vacuum until crystals of glutamic acid hydrochloride begin to separate out. The filtrate is then allowed to stand until crystallization is complete and the crystals are then removed and dried.

The crystalline glutamic acid hydrochloride may thereafter be converted into desired glutamic acid compounds, as for example it may be converted into monosodium glutamate by neutralizing the glutamic acid hydrochloride with sodium carbonate. This may be accomplished by dissolving the sodium carbonate in water and adding glutamic acid hydrochloride crystals. In the resulting reaction both sodium chloride and sodium glutamate are formed and evaporation will accomplish, first, crystallization of the sodium chloride which may be filtered out, and thereafter further concentration will produce crystalline monosodium glutamate.

Where zein or prolamin paste is employed no charring of the materials occurs and the time required for the completion of the digestion is less than where production of glutamic acid compound is attempted from corn gluten.

The practice of the process also results in increased yield, and difficulty of separation is materially reduced.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

We claim:

1. The process of producing glutamic acid compounds, which comprises the steps of extracting zein from gluten press cake by use of a solvent consisting of a mixture of an alcohol and water, and digesting the zein thus produced with hydrochloric acid without submitting the zein to a purification treatment prior to such digestion.

2. A process of producing glutamic acid compounds, which comprises the steps of extracting zein from gluten press cake by the use of a solvent consisting of a mixture of an alcohol and water, and digesting the zein thus produced with hydrochloric acid to form glutamic acid hydrochloride in crystals, said digestion being effected without submitting the zein to a purification treatment prior thereto.

3. A process of producing glutamic acid compounds which comprises the steps of extracting zein from gluten press cake by the use of a solvent consisting of a mixture of an alcohol and water to furnish an extract in the form of a paste consisting of about 25 per cent. of solid zein and 75 per cent. of solvent, and heating said paste in hydrochloric acid, decolorizing the condensate produced by the heating with charcoal, filtering the decolorized condensate, and concentrating the filtrate under vacuum.

4. A process of producing glutamic acid compounds, which comprises the steps of extracting zein from gluten press cake by the use of a solvent consisting of a mixture of an alcohol and water, converting the zein in the resulting solution into the form of a dry powder, digesting said powder with hydrochloric acid in a reflux condenser, said digestion being effected without submitting the zein to a purification treatment prior thereto, decolorizing the condensate by charcoal, filtering the decolorized condensate and concentrating the filtrate until crystals of glutamic acid hydrochloride separate out.

EDWARD BARTOW.
RAYMOND L. ALBROOK.